US012699495B2

(12) United States Patent
Chang

(10) Patent No.: US 12,699,495 B2
(45) Date of Patent: Aug. 4, 2026

(54) ELECTROMAGNETIC TOUCH DEVICE

(71) Applicant: E Ink Holdings Inc., Hsinchu (TW)

(72) Inventor: Chien-Hsing Chang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 19/204,575

(22) Filed: May 11, 2025

(65) Prior Publication Data

US 2025/0370580 A1 Dec. 4, 2025

(30) Foreign Application Priority Data

Jun. 3, 2024 (TW) .................................. 113120479

(51) Int. Cl.
 *G06F 3/046* (2006.01)
 *G06F 3/041* (2006.01)
(52) U.S. Cl.
 CPC .......... *G06F 3/046* (2013.01); *G06F 3/04166* (2019.05)
(58) Field of Classification Search
 None
 See application file for complete search history.

(56) References Cited

U.S. PATENT DOCUMENTS

| | | | |
|---|---|---|---|
| 9,171,664 B2 | 10/2015 | Mao et al. | |
| 11,294,522 B2 | 4/2022 | Liu | |
| 2011/0006759 A1* | 1/2011 | Fukushima | G06F 3/046 |
| | | | 324/207.15 |

FOREIGN PATENT DOCUMENTS

| | | |
|---|---|---|
| CN | 104808861 | 7/2015 |
| CN | 114530694 | 5/2022 |
| CN | 117369671 | 1/2024 |
| TW | 201312412 | 3/2013 |
| WO | 2024029672 | 2/2024 |

OTHER PUBLICATIONS

"Office Action of Taiwan Counterpart Application", issued on Jul. 7, 2025, p. 1-p. 6.

* cited by examiner

*Primary Examiner* — Nicholas J Lee
(74) *Attorney, Agent, or Firm* — JCIPRNET

(57) ABSTRACT

An electromagnetic touch device including a sensor panel and a driving circuit is provided. The sensor panel includes multiple sensor coils independently driven. Each of the sensor coils includes a first connecting terminal, a second connecting terminal, and a coil wiring connected between the first connecting terminal and the second connecting terminal. The coil wiring includes multiple conductor wires that are connected in parallel. The driving circuit is electrically connected to the sensor coils.

9 Claims, 5 Drawing Sheets

L110(110D)

R110(110D)

GL

100B

SU

SU

GL

SL GL

X

Y

ELECTROMAGNETIC TOUCH DEVICE

CROSS-REFERENCE TO RELATED APPLICATION

This application claims the priority benefit of Taiwan application serial no. 113120479, filed on Jun. 3, 2024. The entirety of the above-mentioned patent application is hereby incorporated by reference herein and made a part of this specification.

BACKGROUND

Technical Field

The disclosure relates to a touch device, and more particularly, to an electromagnetic touch device.

Description of Related Art

The development of touch technology provides users with a direct and convenient operation mode, which has been widely used in various electronic devices. All types of touch technologies are constantly improving and progressing. For example, various touch technologies are developing towards more accuracy, cost savings, and compact sizes.

SUMMARY

The disclosure provides an electromagnetic touch device, which may provide good touch sensitivity.

An electromagnetic touch device in the disclosure includes a sensor panel and a driving circuit. The sensor panel includes multiple sensor coils independently driven. Each of the sensor coils includes a first connecting terminal, a second connecting terminal, and a coil wiring connected between the first connecting terminal and the second connecting terminal. The coil wiring includes multiple conductor wires, and the conductor wires are connected in parallel to each other. The driving circuit is electrically connected to the sensor coils.

In an embodiment of the disclosure, the coil wiring further includes two end portions. Ends of each of the conductor wires are connected to the end portions to be connected in parallel to each other, and the end portions are respectively connected to the first connecting terminal and the second connecting terminal.

In an embodiment of the disclosure, each of the sensor coils further includes a connection conductor, and the connection conductor is connected between the conductor wires. The connection conductor is in a linear shape. The connection conductor is in a point-like shape.

The connection conductor is disposed on a coil path of each of the sensor coils.

In an embodiment of the disclosure, the sensor coils are arranged in an array, and each of the sensor coils is disposed in a same conductor layer.

In an embodiment of the disclosure, the sensor coils include multiple first sensor coils arranged in parallel to each other and multiple second sensor coils arranged in parallel to each other, and an extension direction of each of the first sensor coils intersects an extension direction of each of the second sensor coils. The first sensor coils and the second sensor coils are different conductor layers.

In an embodiment of the disclosure, a resistance of each of the sensor coils is less than 4 ohms.

In an embodiment of the disclosure, one of the first connecting terminal and the second connecting terminal of each of the sensor coils is grounded, and the driving circuit is adapted to read a signal of the other one of the first connecting terminal and the second connecting terminal of each of the sensor coils.

Based on the above, the electromagnetic touch device according to the embodiments of the disclosure uses the parallel conductor wires to form the coil wiring of the sensor coil, which may provide a low-impedance coil wiring, thereby increasing the amount of sensing signals.

DETAILED DESCRIPTION OF DISCLOSED EMBODIMENTS

Figure 1:
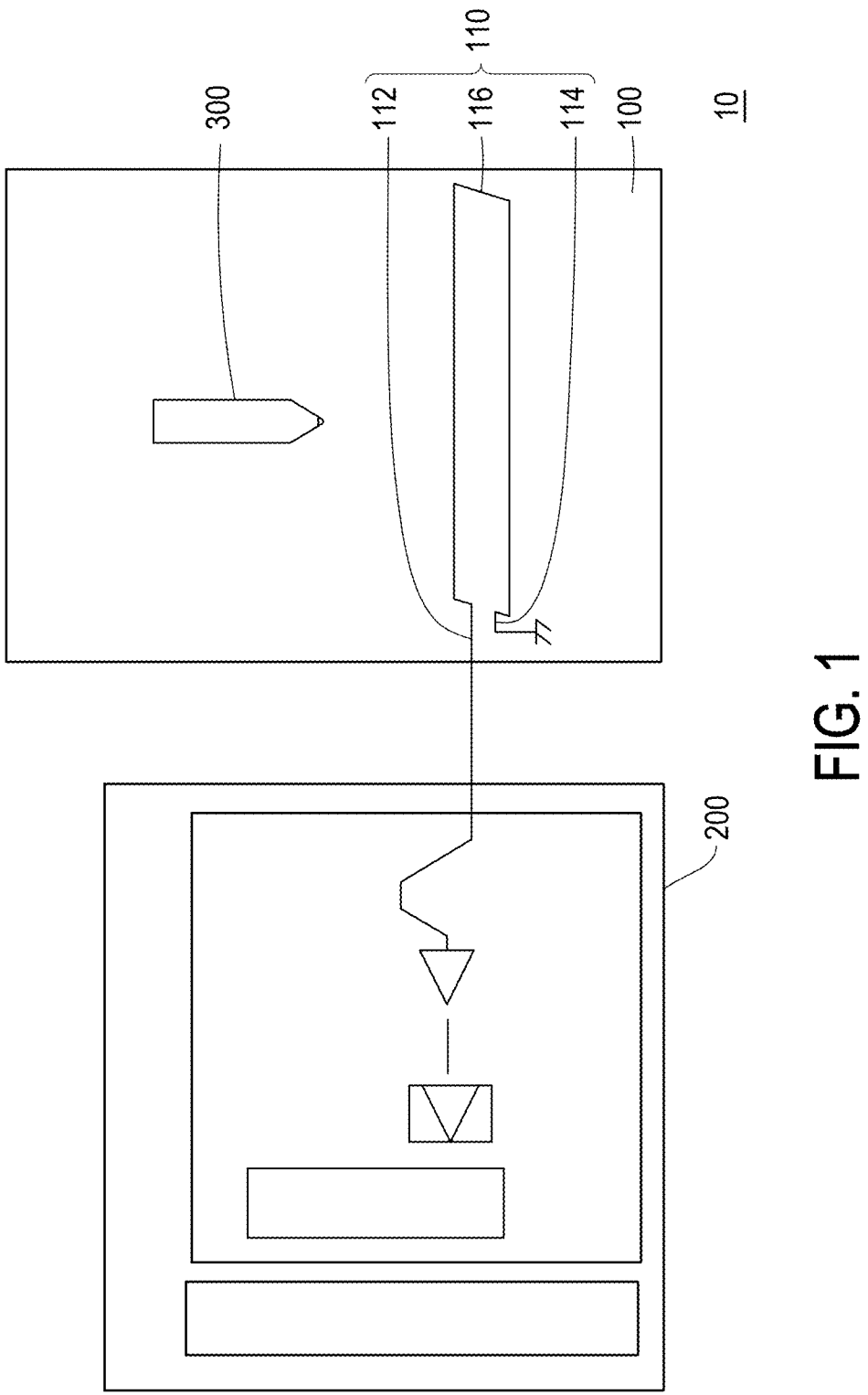
FIG. 1 is a schematic view of an electromagnetic touch device.

FIG. 1 is a schematic view of an electromagnetic touch device. As shown in FIG. 1, an electromagnetic touch device 10 may include a sensor panel 100 and a driving circuit 200. The sensor panel 100 includes multiple sensor coils 110 independently driven. Each of the sensor coils 110 includes a first connecting terminal 112, a second connecting terminal 114, and a coil wiring 116 connected between the first connecting terminal 112 and the second connecting terminal 114. The driving circuit 200 is electrically connected to the sensor coil 110. The driving circuit 200 may include circuit elements such as an amplifier circuit, a comparison circuit, and a processor circuit to interpret a signal sensed by the sensor coil 110 and/or provide a driving signal to the sensor coil 110. Specifically, one of the first connecting terminal 112 and the second connecting terminal 114 of each of the sensor coils 110 may be grounded, and the driving circuit 200 is adapted to read a signal of the other one of the first connecting terminal 112 and the second connecting terminal 114 of each of the sensor coils 110.

In addition, the electromagnetic touch device 10 may be used with a trigger device 300 to implement touch sensing. The trigger device 300 may be, for example, an electromagnetic pen. When the trigger device 300 approaches or contacts the sensor panel 100, it may trigger the sensor coil 110 at a corresponding position to generate electromagnetic sensing to generate a signal. At this time, the driving circuit 200 may read the signal of the corresponding sensor coil 110 to determine a touch position.

For simplicity of the drawing, only one single sensor coil 110 is shown in FIG. 1, and the sensor coil 110 is presented in FIG. 1 only in a schematic manner. In some embodiments, the coil wiring 116 in each of the sensor coils 110 may include multiple conductor wires connected in parallel (not shown in FIG. 1), and the coil wiring 116 is a single coil formed by the conductor wires connected in parallel. The conductor wires connected in parallel may provide low impedance, so that the coil wiring 116 may generate sufficient sensing currents with only one single coil. In some embodiments, the impedance of the coil wiring 116 in each of the sensor coils 110 may be less than/equal to 4 ohms. The sensor coil 110 does not require a high-density layout to provide effective touch sensing capabilities. In other words, the electromagnetic touch device may have good touch sensitivity.

Figure 2:
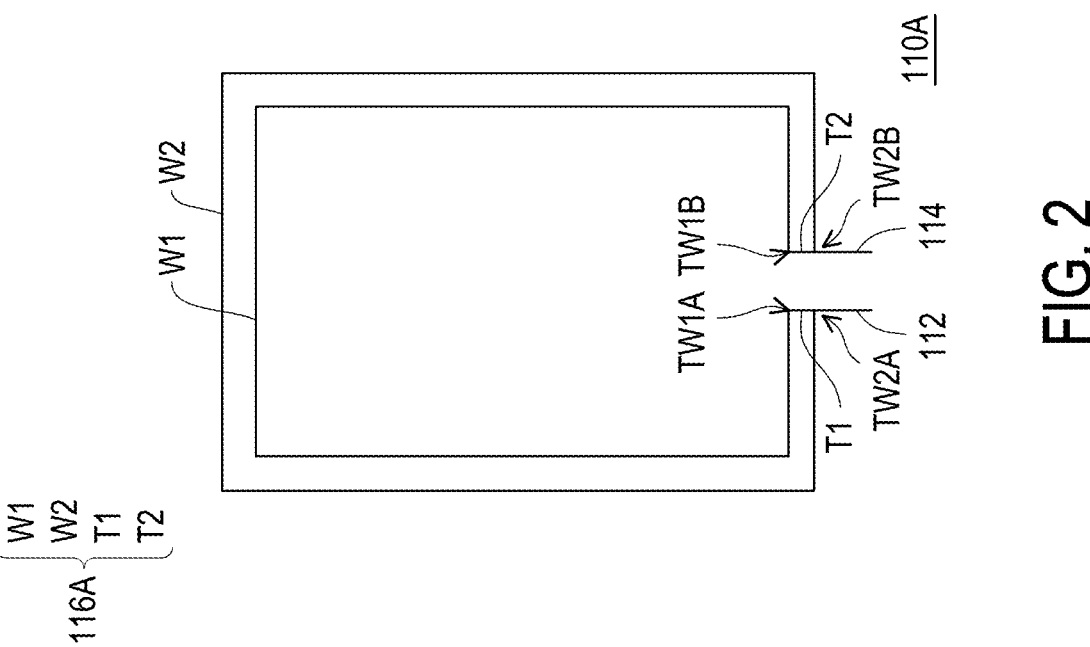

FIGS. 2 to 5 are exemplary structures of sensor coils according to some embodiments of the disclosure. In FIG. 2, a sensor coil 110A includes the first connecting terminal 112, the second connecting terminal 114, and a coil wiring 116A connected between the first connecting terminal 112 and the second connecting terminal 114. The coil wiring 116A includes multiple parallel conductor wires W1 and W2. The conductor wires W1 and wire W2 are spaced apart from each other and both are disposed along a coil path to form the coil wiring 116A. Specifically, the conductor wire W1 forming the coil wiring 116A has two ends TW1A and TW1B, and the end TW1A and the end TW1B are connected to the first connecting terminal 112 and the second connecting terminal 114 respectively. At the same time, the conductor wire W2 forming the coil wiring 116A also has two ends TW2A and TW2B, and the end TW2A and the end TW2B are connected to the first connecting terminal 112 and the second connecting terminal 114 respectively.

As shown in FIG. 2, the coil wiring 116A further includes two end portions T1 and T2. The end TW1A of the conductor wire W1 and the end TW2A of the conductor wire W2 are both connected to the end portion T1, and the end TW1B of the conductor wire W1 and the end TW2B of the conductor wire W2 are both connected to the end portion T2. At the same time, the end portion T1 and the end portion T2 are connected to the first connecting terminal 112 and the second connecting terminal 114 respectively. In this way, the conductor wire W1 and the conductor wire W2 may be connected in parallel to each other through the end portion T1 and the end portion T2, and the end portion T1 and the end portion T2 of the coil wiring 116A are connected to the first connecting terminal 112 and the second connecting terminal 114 respectively. The end portion T1 and the end portion T2 are represented by a linear structure here, but the disclosure is not limited thereto. In other embodiments, the end portion T1 and the end portion T2 may have a point-like structure or other geometric shapes.

The coil formed by the conductor wire W1 and the conductor wire W2 is shown as a rectangular coil here. However, in fact, the coil formed by the conductor wire W1 and the conductor wire W2 is not limited to a rectangular shape, but may be a coil of other shapes. The coil formed by the conductor wire W1 is located on an inner side, and the coil formed by the conductor wire W2 is located on an outer side. In some embodiments, a spacing between the conductor wire W1 and the conductor wire W2 may be a fixed value along the coil path, but may also be a non-fixed value.

Figure 3:
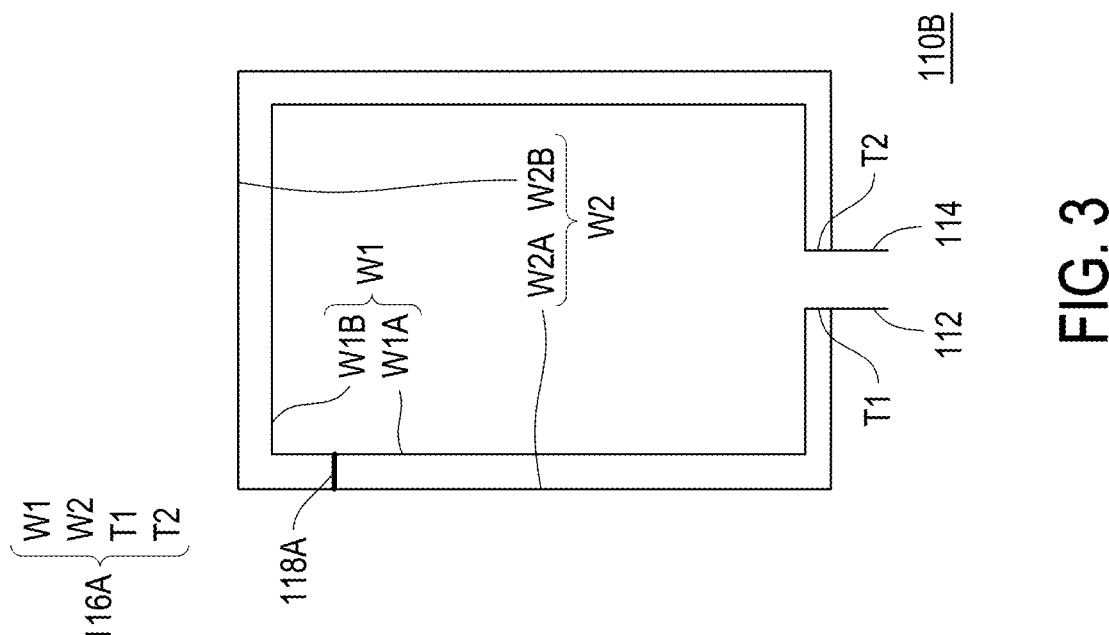
FIGS. 2 to 5 are exemplary structures of sensor coils according to some embodiments of the disclosure.

A sensor coil 110B in FIG. 3 also includes an additional connection conductor 118A in addition to including assembly structures/portions of the sensor coil 110A in FIG. 2. Therefore, the same reference numerals in FIGS. 2 and 3 denote the same or similar structures/portions, and relevant descriptions in FIG. 2 may be applied to the sensor coil 110B in FIG. 3. The connection conductor 118A is connected between the conductor wire W1 and the conductor wire W2, and is located on a coil path of the sensor coil 110B. For example, the connection conductor 118A is located on a coil path between the end portion T1 and the end portion T2, that is, located within an area enclosed by the conductor wire W1, the conductor wire W2, the end portion T1, and the end portion T2. The conductor wire W1 may be divided into a line segment W1A between the end portion T1 and the connection conductor 118A and a line segment W1B between the connection conductor 118A and the end portion T2, and the conductor wire W2 may be divided into a line segment W2A between the end portion T1 and the connection conductor 118A and a line segment W2B between the connection conductor 118A and the end portion T2. The line segment W1A of the conductor wire W1 and the line segment W2A of the conductor wire W2 may be connected in parallel through the end portion T1 and the connection conductor 118A, and the line segment W1B of the conductor wire W1 and the line segment W2B of the conductor wire W2 may be connected in parallel through the connection conductor 118A and the end portion T2. The connection conductor 118A is connected between the conductor wire W1 and the conductor wire W2, and has a linear structure in FIG. 3. However, in different embodiments, the connection conductor 118A may optionally be in point-like or other geometric shapes. In addition, in some embodiments, the number of connection conductors 118A may be set to multiple, distributed in the coil path between the end portion T1 and the end portion T2 and connected between the conductor wire W1 and the conductor wire W2.

Figure 4:
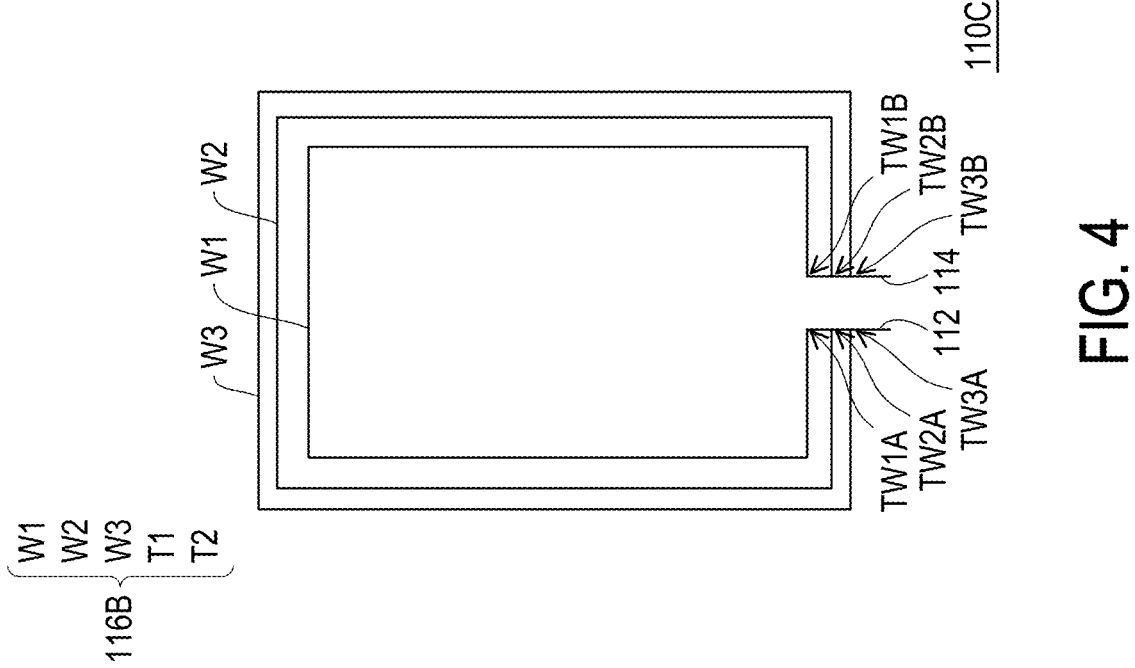

A sensor coil 110C in FIG. 4 also includes another conductor wire W3 in addition to including the assembly structures/portions of the sensor coil 110A in FIG. 2. Therefore, the same reference numerals in FIGS. 2 and 4 denote the same or similar structures/portions, and the relevant descriptions in FIG. 2 may be applied to the sensor coil 110C in FIG. 4. Specifically, the sensor coil 110C includes the first connecting terminal 112, the second connecting terminal 114, and a coil wiring 116B connected between the first connecting terminal 112 and the second connecting terminal 114. The coil wiring 116B also includes the conductor wire W3 in addition to including the conductor wire W1, the conductor wire W2, the end portion T1, and the end portion T2. The conductor wire W1, the conductor wire W2, and the conductor wire W3 each form a single-wire coil and are disposed side by side. The conductor wire W1, the conductor wire W2, and the conductor wire W3 may be connected in parallel by the end portion T1 and the end portion T2. For example, the end TW1A of the conductor wire W1, the end TW2A of the conductor wire W2, and an end TW3A of the conductor wire W3 are all connected to the end portion T1, and the end TW1B of the conductor wire W1, the end TW2B of the conductor wire W2, and an end TW3B of the conductor wire W3 are all connected to the end portion T2. Therefore, the conductor wire W1, the conductor wire W2, and the conductor wire W3 are connected in parallel to each other. In some embodiments, the sensor coil 110C in FIG. 4 may optionally further include the connection conductor 118A similar to that described in FIG. 2, and the connection conductor 118A may be connected between any two of the conductor wire W1, the conductor wire W2, and the conductor wire W3 or connected to the conductor wire W1, the conductor wire W2, and the conductor wire W3 at the same time. In some embodiments, the sensor coil 110C may have more conductor wires.

Figure 5:
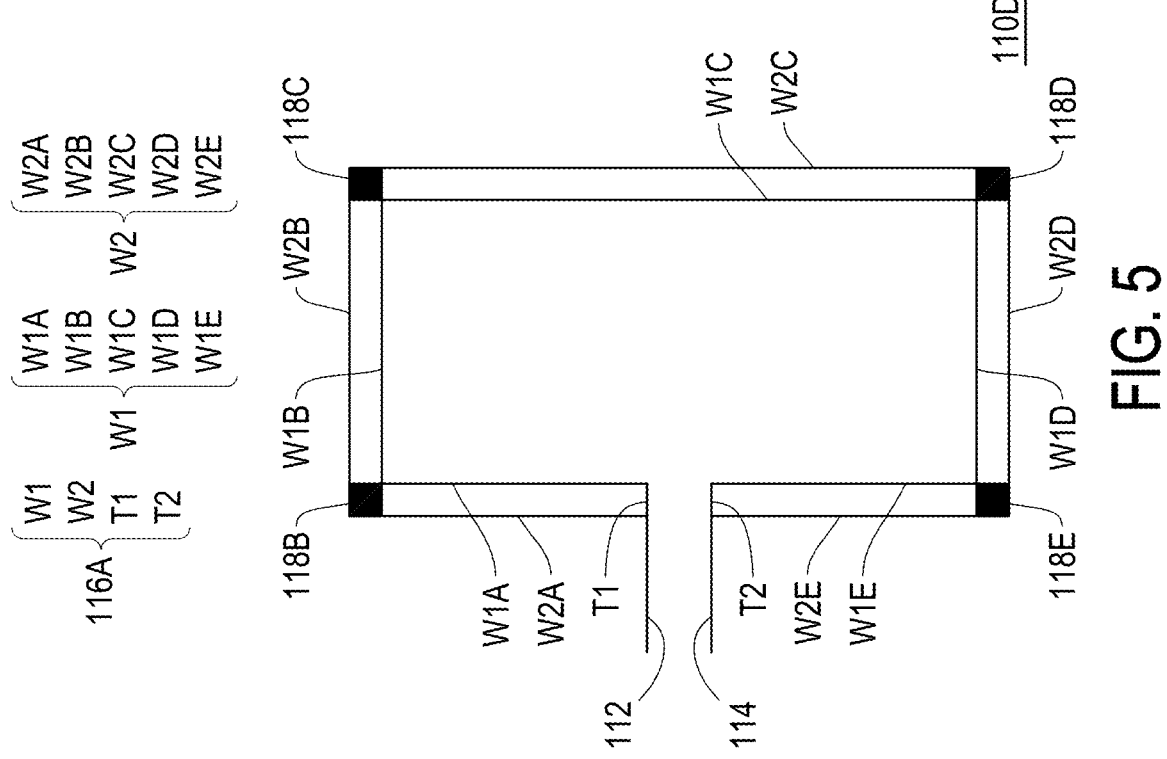

A sensor coil 110D in FIG. 5 also includes additional connection conductors 118B to 118E in addition to including the assembly structures/portions of the sensor coil 110A in FIG. 2. Therefore, the same reference numerals in FIGS. 2 and 5 denote the same or similar structures/portions, and the relevant descriptions in FIG. 2 may be applied to the sensor coil 110D in FIG. 5. Specifically, the sensor coil 110D also includes the connection conductors 118B to 118E in addition to including the first connecting terminal 112, the second connecting terminal 114, and the coil wiring 116A connected between the first connecting terminal 112 and the second connecting terminal 114. The coil wiring 116A may include the conductor wire W1, the conductor wire W2, the end portion T1, and the end portion T2. The end portion T1 and the end portion T2 connect the conductor wire W1 and the conductor wire W2 in parallel and are connected to the first connecting terminal 112 and the second connecting terminal 114 respectively.

In FIG. 5, the conductor wire W1 and the conductor wire W2 respectively surround the single-wire coil along a rectangular path, and the connection conductors 118B to 118E are located at four corners of the coil path. The conductor wire W1 may be divided into the line segment W1A, the line segment W1B, a line segment W1C, a line segment W1D, and a line segment WIE by the connection conductors 118B to 118E. The line segment WIA is located between the end portion T1 and the connection conductor 118B. The line segment W1B is located between the connection conductor 118B and the connection conductor 118C. The line segment WIC is located between the connection conductor 118C and the connection conductor 118D. The line segment W1D is located between the connection conductor 118D and the connection conductor 118E. The line segment WIE is located between the connection conductor 118E and the end portion T2. Similarly, the conductor wire W2 may also be divided into the line segment W2A, the line segment W2B, a line segment W2C, a line segment W2D, and a line segment W2E by the connection conductors 118B to 118E. In this way, the line segment W1A and the line segment W2A may be connected in parallel through the end portion T1 and the connection conductor 118B.

The line segment W1B and the line segment W2B may be connected in parallel through the connection conductor 118B and the connection conductor 118C. The line segment WIC and the line segment W2C may be connected in parallel through the connection conductor 118C and the connection conductor 118D. The line segment WID and the line segment W2D may be connected in parallel through the connection conductor 118D and the connection conductor 118E. The line segment WIE and the line segment W2E may be connected in parallel through the connection conductor 118E and the end portion T2.

In FIG. 5, the connection conductors 118B to 118E each have a point-like structure, but the disclosure is not limited thereto. In other embodiments, the connection conductors 118B to 118E may optionally have a linear structure or other geometric shapes. In addition, in FIG. 5, the four connection conductors 118B to 118E are taken as an example for description, but in other embodiments, the number of connection conductors may be increased or decreased. In addition, the sensor coils 110A to 110D in FIGS. 2 to 5 may be manufactured on a substrate using a deposition process, a photolithography etching process, etc., and may be formed by the same conductor layer.

Figure 6:
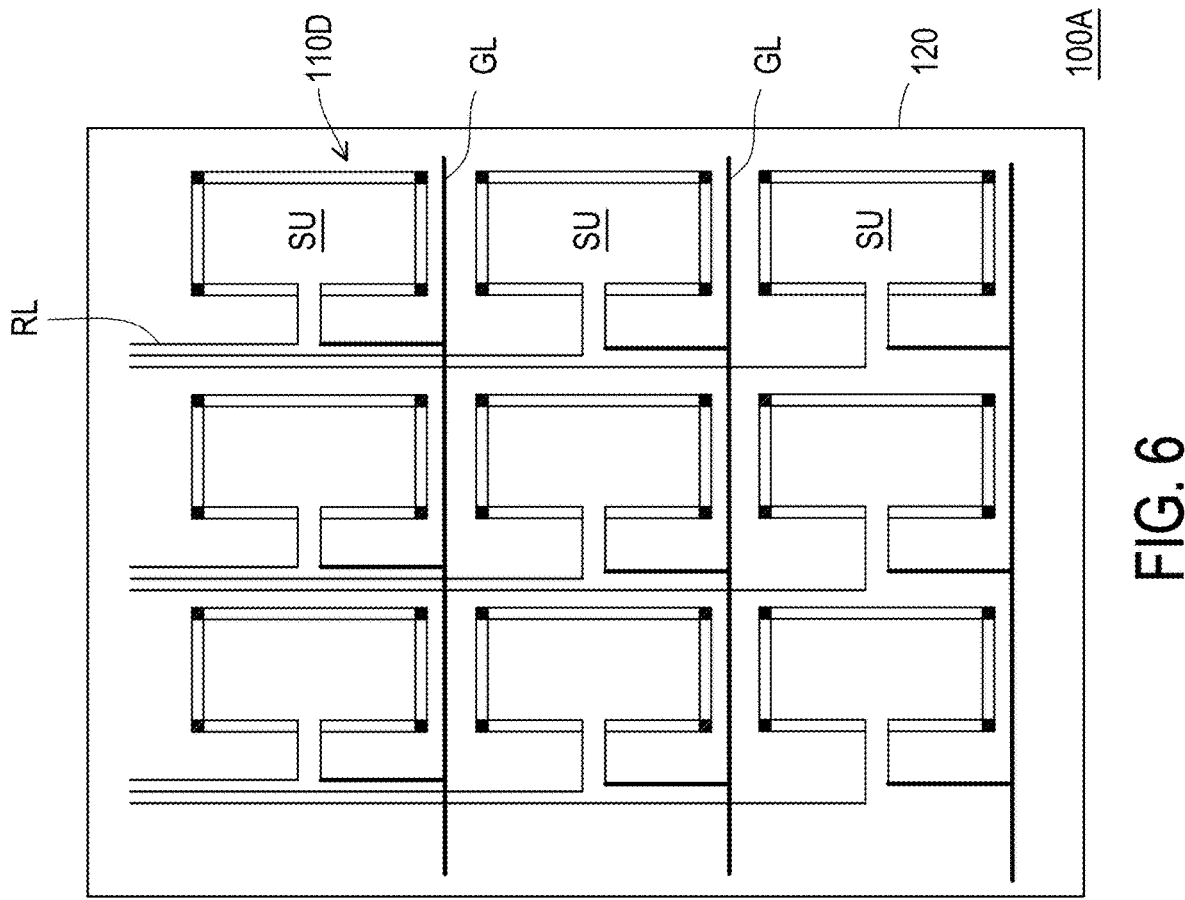
FIG. 6 is a schematic view of a sensor panel according to an embodiment of the disclosure.

FIG. 6 is a schematic view of a sensor panel according to an embodiment of the disclosure. In FIG. 6, a sensor panel 100A may be used as an exemplary implementation of the sensor panel 100 in FIG. 1. The sensor panel 100A includes multiple sensor coils 110D that may be independently driven and a substrate 120. The substrate 120 may be a plate-like member having support force. The sensor coils 110D are arranged in an array on the substrate 120 to form an array of sensor units SU. In FIG. 6, as an example, the sensor coil 110D is used as the sensor unit SU of the sensor panel 100A. In other embodiments, the sensor coil 110D may be replaced by any structure in FIGS. 2 to 4.

The sensor panel 100A may further include a ground line GL and a driving read line RL. One terminal of each of the sensor coils 110D may be connected to the ground line GL, and another terminal may be connected to the driving read line RL. The driving read line RL may be connected to the driving circuit 200 in FIG. 1 to transmit a sensing signal generated by the sensor coil 110D to the driving circuit 200 or transmit the driving signal to the sensor coil 110D by the driving circuit 200. Referring to descriptions in FIGS. 2 to 5, the sensor coil 110D is formed by the parallel conductor wires W1 and W2, and the conductor wire W1, the conductor wire W2, the end portion T1, and the end portion T2 enclose a closed C-shaped area. In some embodiments, a resistance of the single sensor coil 110D may be less than 4 ohms, and such a small resistance helps to increase an amount of sensing currents of the sensor coil 110D. When the sensor coil 110D is replaced by the structures of FIGS. 2 to 4, the resistance of the corresponding sensor coil may also be less than 4 ohms, which helps to improve sensitivity of touch sensing. In addition, the sensing amount of the sensor coil 110D is relatively significant and is not required to be disposed in a highly dense manner in the sensor panel 100A to achieve required sensing results. Wirings of the sensor coil 110D is not required to be densely disposed to avoid unwanted short circuits or process defects.

Figure 7:
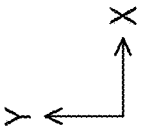
FIG. 7 is a schematic view of a sensor panel according to an embodiment of the disclosure.

FIG. 7 is a schematic view of a sensor panel according to an embodiment of the disclosure. In FIG. 7, a sensor panel 100B may be used as an exemplary implementation of the sensor panel 100 in FIG. 1. The sensor panel 100B includes the sensor coils 110D that may be independently driven and the substrate 120. The sensor coil 110D includes multiple first sensor coils R110 arranged in parallel to each other and multiple second sensor coils L110 arranged in parallel to each other, and an extension direction of each of the first sensor coils R110 intersects an extension direction of each of the second sensor coils L110. The first sensor coil R110 and the second sensor coil L110 are different conductor layers. Specifically, the sensor panel 100B may further include an insulation layer (not shown) to separate the conductor layer of the first sensor coil R110 from the conductor layer of the second sensor coil L110.

The first sensor coil R110 is, for example, a long coil extending along a first direction X, and the second sensor coil L110 is, for example, a long coil extending along a second direction Y. That is to say, each of the first sensor coils R110 has a long axis in the first direction X, and each of the second sensor coils L110 has a long axis in the second direction Y. The first sensor coils R110 are arranged in parallel to each other along the second direction Y, and the second sensor coils L110 are arranged in parallel to each other along the first direction X. In this way, the first sensor coils R110 and the second sensor coils L110 are disposed to intersect each other to define the sensor units SU, and the sensor units SU are arranged in an array.

In this embodiment, the first sensor coil R110 and the second sensor coil L110 are implemented with a structure of the sensor coil 110D in FIG. 5, but the disclosure is not limited thereto. In other embodiments, the first sensor coil R110 and the second sensor coil L110 may be implemented using any structure shown in FIGS. 2 to 5. In addition, the sensor panel 100B may further include the ground line GL and the driving read line RL. One terminal of each of the sensor coils 110D of the first sensor coil R110 and the second sensor coil L110 may be connected to the ground line GL, and another terminal may be connected to the driving read line RL.

Based on the above, the electromagnetic touch device according to the embodiments of the disclosure includes the sensor coils independently driven, and each of the sensor coils includes the conductor wires connected in parallel. In this way, the resistance of each of the sensor coils may be reduced, and the amount of the sensing currents of each of the sensor coils may be increased, thereby achieving good sensing sensitivity.

What is claimed is:

1. An electromagnetic touch device, comprising:

a sensor panel comprising a plurality of sensor coils independently driven, wherein each of the sensor coils comprises a first connecting terminal, a second connecting terminal, and a coil wiring connected between the first connecting terminal and the second connecting terminal, the coil wiring comprises a plurality of conductor wires, and the conductor wires are connected in parallel to each other; and a driving circuit electrically connected to the sensor coils, wherein each of the sensor coils further comprises a connection conductor, and the connection conductor is connected between the conductor wires.

2. The electromagnetic touch device according to claim 1, wherein the coil wiring further comprises two end portions, ends of each of the conductor wires are connected to the end portions to be connected in parallel to each other, and the end portions are respectively connected to the first connecting terminal and the second connecting terminal.

3. The electromagnetic touch device according to claim 1, wherein the connection conductor is in a linear shape.

4. The electromagnetic touch device according to claim 1, wherein the connection conductor is in a point-like shape.

5. The electromagnetic touch device according to claim 1, wherein the connection conductor is disposed on a coil path of each of the sensor coils.

6. The electromagnetic touch device according to claim 1, wherein the sensor coils are arranged in an array, and each of the sensor coils is disposed in a same conductor layer.

7. The electromagnetic touch device according to claim 1, wherein the sensor coils comprise a plurality of first sensor coils arranged in parallel to each other and a plurality of second sensor coils arranged in parallel to each other, an extension direction of each of the first sensor coils intersects an extension direction of each of the second sensor coils, and the first sensor coils and the second sensor coils are different conductor layers.

8. The electromagnetic touch device according to claim 1, wherein a resistance of each of the sensor coils is less than 4 ohms.

9. The electromagnetic touch device according to claim 1, wherein one of the first connecting terminal and the second connecting terminal of each of the sensor coils is grounded, and the driving circuit is adapted to read a signal of the other one of the first connecting terminal and the second connecting terminal of each of the sensor coils.

* * * * *